Figure 1:
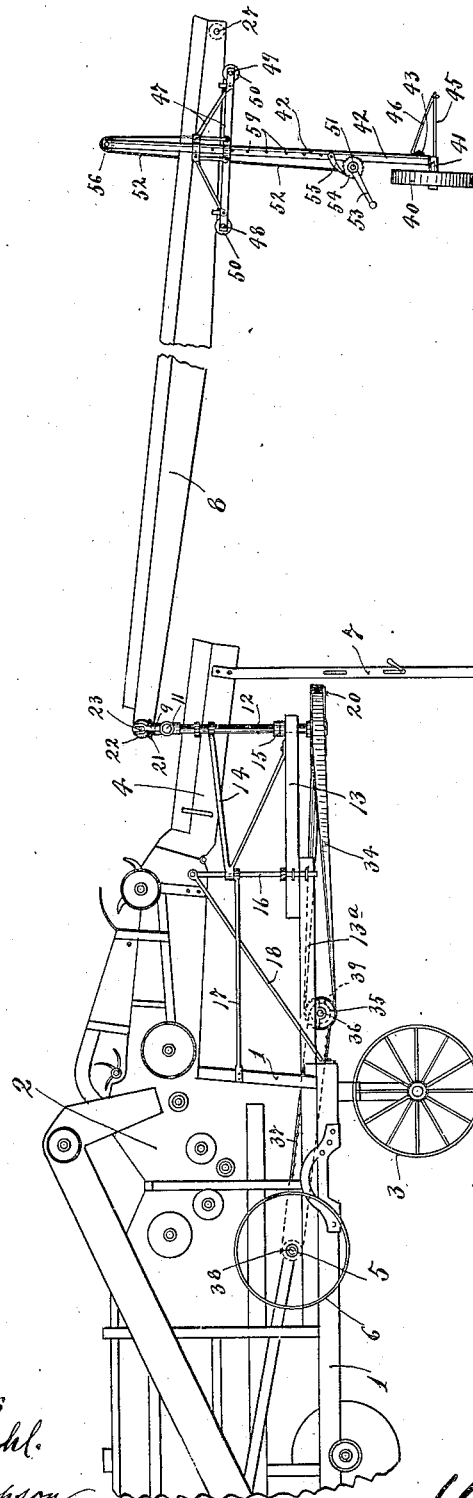

No. 884,753. PATENTED APR. 14, 1908.
W. C. NIEBUHR.
BUNDLE CONVEYING ATTACHMENT FOR THRESHING MACHINES.
APPLICATION FILED DEC. 21, 1907.

3 SHEETS—SHEET 1.

Witnesses
A. H. Opsahl.
L. L. Simpson.

Inventor.
Wm C. Niebuhr
By his Attorneys
Williamson Merchant

No. 884,753. PATENTED APR. 14, 1908.
W. C. NIEBUHR.
BUNDLE CONVEYING ATTACHMENT FOR THRESHING MACHINES.
APPLICATION FILED DEC. 21, 1907.
3 SHEETS—SHEET 2.
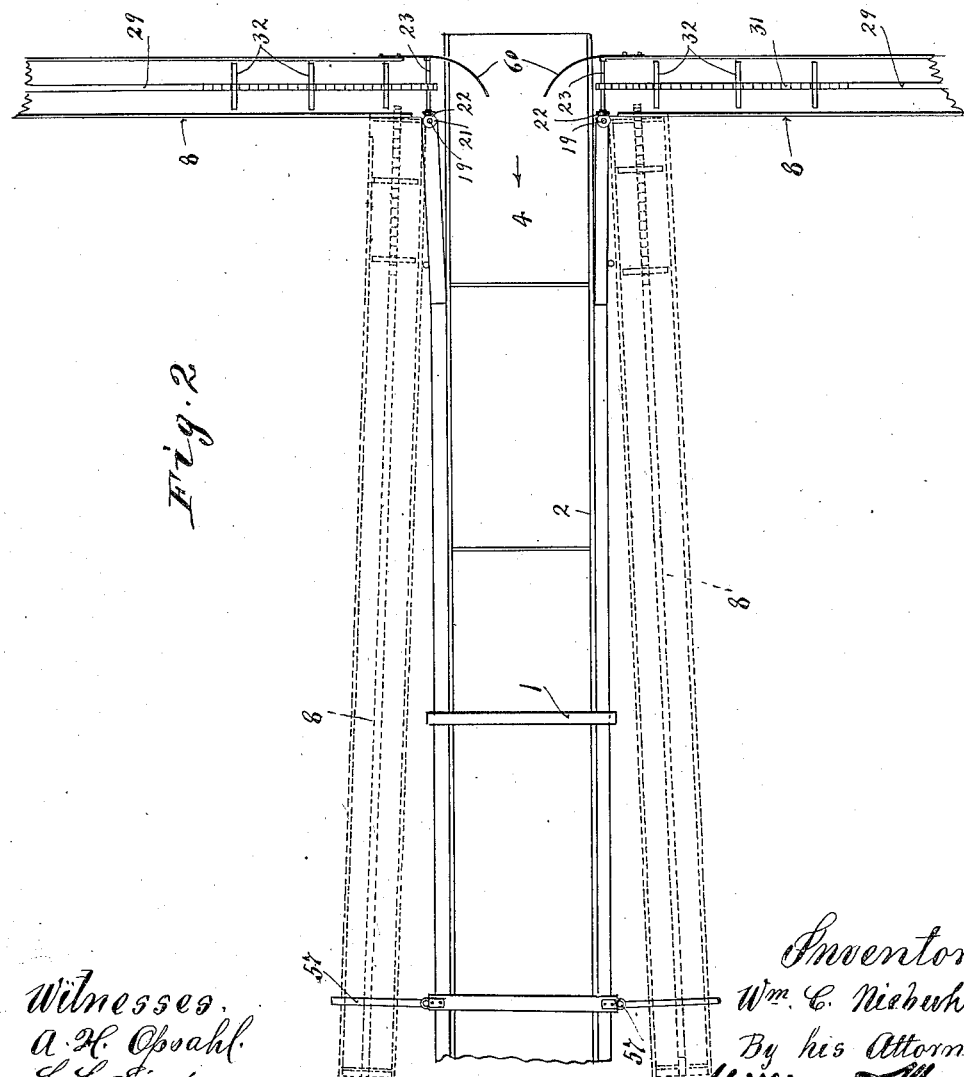

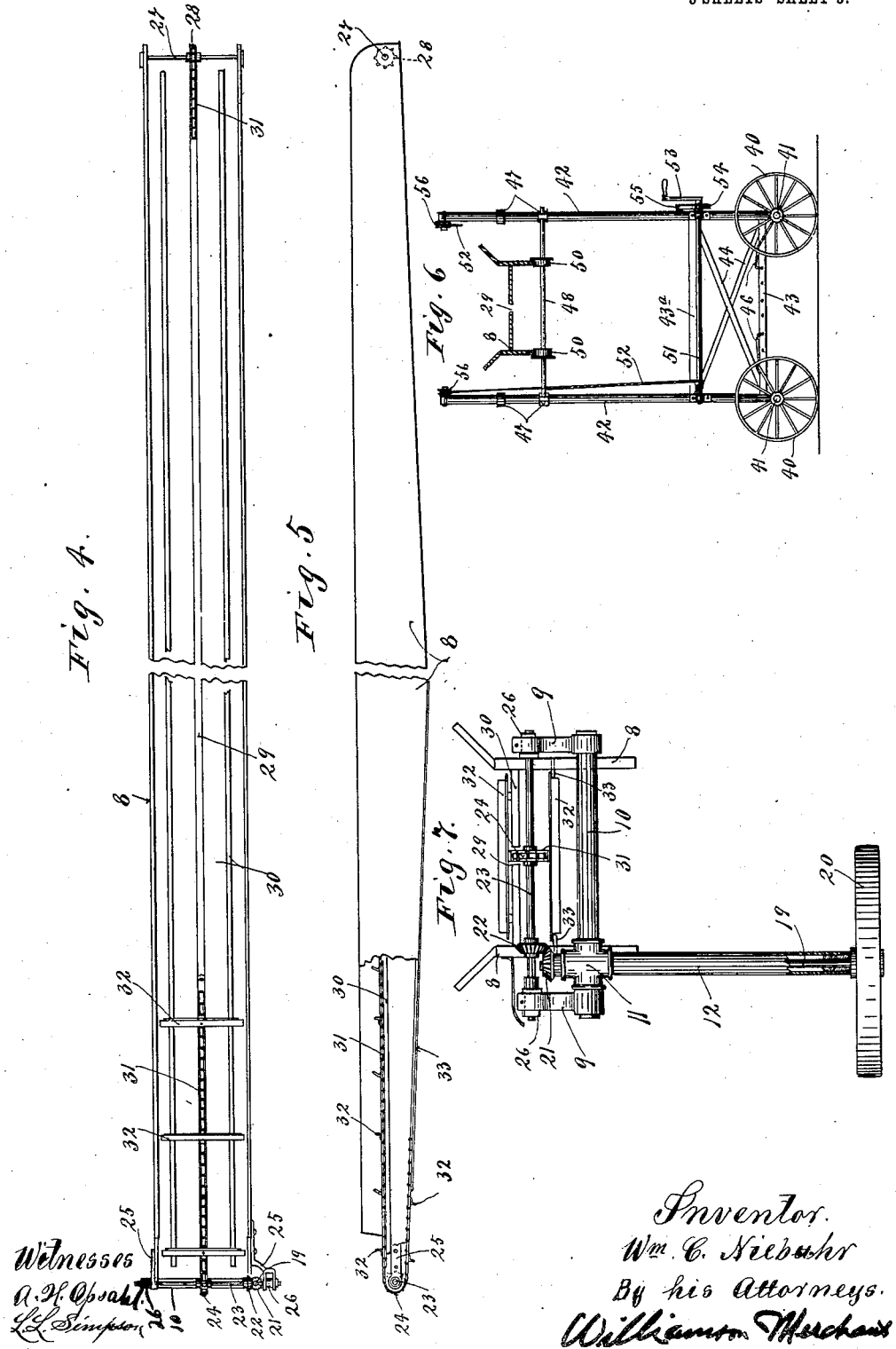

UNITED STATES PATENT OFFICE.

WILLIAM CHARLES NIEBUHR, OF ST. JAMES, MINNESOTA.

BUNDLE-CONVEYING ATTACHMENT FOR THRESHING-MACHINES.

No. 884,753.　　　　　Specification of Letters Patent.　　　Patented April 14, 1908.

Application filed December 21, 1907. Serial No. 407,520.

*To all whom it may concern:*

Be it known that I, WILLIAM CHARLES NIEBUHR, a citizen of the United States, residing at St. James, in the county of Watonwan and State of Minnesota, have invented certain new and useful Improvements in Bundle-Conveying Attachments for Threshing-Machines; and I do hereby declare the following to be a full, clear, and exact description of the invention, such as will enable others skilled in the art to which it appertains to make and use the same.

My invention has for its object to provide an improved bundle feeding attachment for threshing machines, by the use of which the bundles from quite a large number of adjacent stacks may be fed to the band cutting and feeding device of a threshing machine, without requiring the threshing machine to be moved.

To the above ends the invention consists of the novel devices and combinations of devices hereinafter described and defined in the claims.

It is a well known fact that considerable work and time are required to change the position of a threshing machine, and to again couple the same up to the traction engine used to drive the same. Furthermore, while the threshing machine is being moved and again connected up, a large threshing crew is compelled to remain idle, and this, of course, causes a very considerable money loss to the operator of the threshing machine.

My invention makes it possible to feed the bundles from quite a large number of adjacent stacks, without requiring the threshing machine to be moved, and thereby reduces to a minimum the number of movements of the threshing machine required on any particular job.

In the accompanying drawings which illustrate the invention, like characters indicate like parts throughout the several views.

Referring to the drawings, Figure 1 is a view in side elevation, showing a threshing machine of standard construction with my improved bundle conveying attachment applied thereto, some parts being broken away and some parts being indicated in diagram. Fig. 2 is a diagrammatic plan view of the parts shown in Fig. 1. Fig. 3 is a detail in side elevation, showing a bracket which is applied to the rear end portion of the machine case and which serves to hold the coöperating conveyer frame in an inoperative position. Fig. 4 is a plan view, with some parts broken away, showing in detail one of the bundle conveying devices. Fig. 5 is a view in side elevation, but with some parts broken away, of the parts shown in Fig. 4. Fig. 6 is an elevation of the truck which supports the free end of the bundle conveying device shown in detail in Figs. 4 and 5, the said parts being viewed in a direction from the outer toward the inner end of the said bundle conveying device; and Fig. 7 is a detail partly in elevation and partly in vertical section, showing on a larger scale than in the other views the pivotal support for the inner end of the bundle conveying device.

Of the parts of the threshing machine, it is only desirable for the purposes of this case to note the frame-work 1, the casing 2, front wheels 3, band cutter and feeding table 4 and a transverse power-driven shaft 5, which latter, as shown, carries the usual pulley 6. The band cutting and feeding table 4 is shown as supported, at its free end, by a leg 7 of the customary construction.

Pivotally supported at each side of the machine and arranged to deliver the bundles onto the band cutter and feeder table 4, is a long conveyer frame 8. In practice these frames 8 have usually been made about thirty feet long and, at their inner ends, they have been pivotally connected to bearing brackets 9 rigidly secured to the ends of a transverse bar 10, the latter being preferably formed by a piece of metal pipe. Each pipe or bar 10 is rigidly secured to a head 11, from which depends a tubular standard or pipe section 12.

To support the tubular standard 12 with freedom for oscillatory movements on a vertical axis, it is journaled in the projecting end of a supporting beam 13 and in the upper arm of the bracket 14. On the standard 12 is a collar 15 that engages the supporting beam 13 to hold said standard against downward movements. As illustrated in the drawings, the supporting beam 13 is bolted or otherwise rigidly secured to another beam 13ª which, in turn, is bolted or otherwise rigidly secured to the machine frame 1. A bracket 14 is also directly secured to a vertical rod 16, the upper end of which is secured to the casing 2, and the lower end of which is secured to the beams 13 and 13ᵃ.

The numeral 17 indicates a truss rod which connects the intermediate portion of the rod 16 to the machine frame, and the numeral 18 indicates the usual truss rod which connects the machine frame 1 to the forwardly projecting portion of the casing 2.

Journaled in and extending vertically through the tubular standard 12 is a driving shaft 19, which, at its lower end, carries a pulley 20 and, at its upper end, carries a miter gear 21. The miter gear 21 meshes with a companion gear 22 of a transverse counter-shaft 23, which counter-shaft, at its central portion, carries a sprocket 24.

To pivotally connect the inner end of the conveyer frame 8 to the brackets 9, the latter are preferably forked, as shown in Figs. 1 and 7, and said frame 8 is provided with bearing brackets 25. Said bearing brackets 25, at their projecting ends, are bifurcated to embrace the sides of the pronged ends of the brackets 9 and are provided with rigidly secured hubs or sleeves 26 that rest loosely in the pronged ends of said brackets 9. The shaft 23 just described is journaled, at its ends, in said hubs or sleeves 26.

Loosely journaled in the free end of the conveyer frame 8 is a transverse counter-shaft 27 which, at its central portion, is provided with a sprocket 28. The sprockets 24 and 28 aline with a longitudinally extended channel 29 formed between the inner edges of a pair of horizontally alined skid decks 30, which latter are extended longitudinally of and rigidly secured to the sides of said frame 8.

A sprocket chain 31 runs over the alined sprockets 24 and 28 of the driven and idle shafts 23 and 27, respectively. At suitable intervals, transversely extended slats 32 are intermediately secured to the sprocket chain 31. The chain 31 and its slats 32 constitute an endless bundle conveyer; and the said slats, when moved from the free end toward the inner end of the conveyer frame 8, slide upon and are supported by the skid decks 30. Preferably these slats 32 are formed by light metal angle strips, the projecting flanges of which are cut away at the ends, as best shown in Fig. 7, so that the reduced ends, under return or idle movements, are adapted to slide over and to be supported by guide strips 33 rigidly secured to and extending longitudinally of the sides of the frame 8. By the guide strips 33 the under or idle portion of the endless bundle conveyer is prevented from sagging below the bottom of said frame 8.

Rotary motion is imparted to the upright shaft 19 and, hence, through the shaft 23 to the endless bundle conveyer, by means of a driving belt 34 that runs over the pulley 20 and over a smaller pulley 35, which latter is carried by a counter-shaft 36 mounted, as shown, in suitable bearings on the supporting bars 13ᵃ. The counter-shaft 36, in turn, is driven by a sprocket chain 37 that runs over sprockets 38 and 39, (indicated by dotted lines in Fig. 1) respectively, on the shafts 5 and 36. The shaft 5 is driven in the usual way by a belt (not shown) but which runs over the pulley 6 thereof.

From the above it is evident that the conveyer frames 8 are mounted both for vertical and for lateral pivotal movements, and that motion will be imparted to the endless conveyer 31—32 through the miter gears 21 and 22, regardless of the positions assumed by the said frames.

The outer end of each conveyer frame 8 is adjustably supported by means of a so-called truck, preferably constructed as follows: A pair of truck wheels 40, located one ahead of the other, are journaled on crank-like trunnions 41 which, in turn, are pivotally connected to the lower ends of upright posts 42. These posts 42, near their lower ends, are rigidly tied together by upper and lower tie bars 43 and 43ᵃ and truss bars 44 (see Fig. 6). The trunnions 41 are provided with extended arms 45, the free ends of which are adjustably connected, by links 46, (see Figs. 1 and 6) to a perforated flange of the lower tie bar 43. By securing the links 46 in different perforations of the said bar 43 the two wheels 40 may be set to travel in different curves.

Mounted to slide vertically on each post 42 is a small truss frame 47 that projects forward and rearward of the coöperating post. The forwardly projecting ends of the frames 47 are connected, by a small shaft or rod 48, and the rearwardly projecting ends thereof are likewise connected, by a shaft or rod 49. Loosely journaled on the rods 48 and 49 are flanged wheels 50 upon which the depending side boards of the coöperating conveyer frame 8 rest loosely.

Simultaneous upward and downward movements are adapted to be imparted to the two supporting frames 47 by a windlass comprising a windlass shaft 51 and a pair of cables 52. The shaft 51 is journaled in suitable bearings on the posts 42 and is provided, at one end, with an operating crank 53 and a ratchet wheel 54. A lock dog 55, pivoted to the adjacent post 42, coöperates with the ratchet wheel 54 to lock the shaft 51 in any desired position. The cables 52 run over guide sheaves 56 on the upper ends of the posts 42 and their down-turned ends are attached one to each of the lifting frames 47.

Mounted on each side of the rear end of the case 2 for lateral swinging movements, is a so-called latch bracket 57, upon which the free end of the corresponding conveyer 8 is adapted to be rested and held when turned into an inoperative position, shown by dotted lines in Fig. 2. The two conveyer frames 8 are turned into the positions indicated by dotted lines in Fig. 2 when the machine is to be moved from one job to another, or when, for other reasons, the machine is to be moved over the road. When the conveyer frames are turned outward into operative positions, the latch frames 57 may be turned against the side of the machine case and entirely out of the way.

When the machine has been properly set and connected in the vicinity of several stacks of grain, the conveyer frames 8 may be moved pivotally in a horizontal direction from one stack to the other, and its free end may be raised or lowered to any desired altitude, so that it will be in position to receive in the most advantageous manner the bundles of any particular stack. As the stack is lowered by the carrying of bundles therefrom, the inner end of the conveyer frame should, of course, also be lowered. After one stack has been fed to the machine the other end of the conveyer frame may be quickly moved into position to receive bundles from an adjacent stack. The two-wheeled truck makes lateral swinging movements of the conveyer frame a very easy matter, and the windlass applied to the said truck makes it an easy matter to quickly raise or lower the free end of the conveyer frame. As shown, the posts 42 are provided with vertically spaced perforations 59, through which pins may be inserted to support the frames 47 and, hence, the free end of the conveyer frame, in different vertical positions independently of the windlass. Sometimes it is desirable to support the conveyer frame 8 at its extreme outer end, and at other times it is desirable to support the same at its intermediate portion, or a considerable distance from its free end. This is easily done by moving the supporting truck laterally so as to cause the wheels 50 to travel under the sides of said conveyer frame.

As is evident, all of the bundles delivered onto the conveyer frames 8 will, by the endless conveyers 31—32, be deposited upon the band cutter and feeder table 4, from whence they will be carried to the threshing cylinder, preferably by the customary devices.

In Fig. 2 I have shown a curved deflecting plate 60 applied to one side of the delivery end of each conveyer frame 8. These deflecting plates 60, when the conveyer frames are turned transversely of the threshing machine, serve to turn the bundles so that they will be delivered onto the receiving table 4, extending in a direction approximately parallel to the longitudinal direction of the threshing machine. These plates 60 should be detachably secured by nutted bolts, screws, or other devices, so that they may be quickly removed when the conveyer frame 8 is turned in a direction approximately parallel to the longitudinal direction of the machine.

The bundle conveying device constructed substantially as illustrated in the drawings has been put into actual use in connection with a threshing machine and has been found highly efficient for the purposes had in view. By the use thereof great economy in labor and, hence, in the cost of threshing of grain, has been accomplished.

What I claim is:

1. The combination with a threshing machine, of an upright tubular standard supported in the vicinity of the receiving end of said threshing machine with freedom for oscillatory movements, a conveyer frame connected to said oscillatory tubular standard with freedom for vertical oscillatory movements, an endless conveyer mounted to run over said frame, a shaft extending through said tubular standard, a pair of bevel gears connecting the upper end of said shaft to said conveyer, a pulley on the lower end of said shaft, and a belt driven from one of the running parts of said threshing machine and running over said pulley, substantially as described.

2. The combination with a threshing machine, of an extended conveyer frame provided at one side of its inner extremity with a curved deflecting plate, an endless conveyer mounted to run over said frame, and means for driving said conveyer, substantially as described.

3. The combination with a threshing machine, of a conveyer frame, the inner end of which is arranged to deliver to the receiving end of said threshing machine, an endless conveyer arranged to run over said frame, means for driving said conveyer, and means for imparting vertical oscillatory movements to said frame, comprising a supporting frame and a windlass, substantially as described.

4. A bundle conveyer for threshing machines comprising a conveyer frame mounted for vertical and lateral oscillatory movements, an endless conveyer running over said frame, means for driving said conveyer, a truck located at the free end of said conveyer frame and having posts embracing the sides thereof, supporting frames mounted for vertical movements on said posts and slidably engaging and supporting the free end of said conveyer frame, and means for imparting simultaneous vertical movements to said supporting frames and for securing the same in different vertical adjustments, substantially as described.

5. A bundle conveyer for threshing machines comprising a conveyer frame mounted for vertical and lateral oscillatory movements, an endless conveyer running over said frame, means for driving said conveyer, a truck located at the free end portion of said conveyer frame and having posts embracing the sides thereof, supporting frames slidably mounted on said posts and having wheels engaging and supporting the free end portion of said conveyer frame, and a windlass mounted on said truck and having cables extending over guides on the upper ends of said posts and attached to said supporting frames, substantially as described.

In testimony whereof I affix my signature in presence of two witnesses.

WILLIAM CHARLES NIEBUHR.

Witnesses:
 HERMAN BERG,
 E. A. KOPP.